US012640559B2

(12) United States Patent
Choobineh et al.

(10) Patent No.: US 12,640,559 B2
(45) Date of Patent: May 26, 2026

(54) MICROGRID ERROR HANDLING FRAMEWORK AND METHOD

(71) Applicant: ABB Schweiz AG, Baden (CH)

(72) Inventors: Moein Choobineh, Morrisville, NC (US); Harish Suryanarayana, Apex, NC (US); Aniket M. Joshi, Raleigh, NC (US); Jacob T. Miscio, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 353 days.

(21) Appl. No.: 18/449,309

(22) Filed: Aug. 14, 2023

(65) Prior Publication Data

US 2025/0062611 A1 Feb. 20, 2025

(51) Int. Cl.
*H02J 3/001* (2026.01)

(52) U.S. Cl.
CPC .................................. *H02J 3/001* (2020.01)

(58) Field of Classification Search
CPC . H02J 3/001; H02J 13/00002; G06F 11/0793; G06Q 50/06
See application file for complete search history.

(56) References Cited

U.S. PATENT DOCUMENTS

| | | | |
|---|---|---|---|
| 8,321,194 B2 | 11/2012 | Meagher et al. | |
| 8,547,107 B2 * | 10/2013 | Abe ...................... | H02J 7/0013 307/64 |
| 9,625,928 B2 | 4/2017 | Hajimiragha et al. | |
| 11,128,137 B2 | 9/2021 | de Callafon et al. | |
| 2016/0370447 A1 | 12/2016 | Kim et al. | |

FOREIGN PATENT DOCUMENTS

| | | |
|---|---|---|
| CN | 102738777 A | 10/2012 |
| CN | 112346439 B | 12/2021 |
| EP | 3065245 A1 | 9/2016 |
| KR | 10-2232965 B1 | 3/2021 |
| KR | 10-2022-0045661 A | 4/2022 |

OTHER PUBLICATIONS

WIPO English translation of CN 102738777 (Year: 2012).*
Johnson et al., "Case Studies of Event Detection for Indian Power System using Signal Processing Methods," *31st Australasian Universities Power Engineering Conference (AUPEC)*, 6 pp. (Sep. 26, 2021).
Wang et al., "Feature Selection for Precise Anomaly Detection in Substation Automation Systems," *13th IEEE PES Asia Pacific Power & Energy Engineering Conference (APPEEC)*, 6 pp. (Nov. 21, 2021).
European Patent Office, Extended European Search Report in European Patent Application No. 24194512.0, 8 pp. (Jan. 9, 2025).

* cited by examiner

*Primary Examiner* — Alvin H Tan
(74) *Attorney, Agent, or Firm* — Fitch Even Tabin & Flannery LLP

(57) ABSTRACT

A method of handling one or more errors in a microgrid includes measuring an attribute of a device within the microgrid for a measurement cycle and comparing the measured attribute of the device with a predetermined threshold attribute value. The presence of an error associated with the device is detected based on the comparison of the measured attribute with the predetermined threshold attribute value. An error signal is created that includes a numerical sequence having at least three digits, the numerical sequence identifying the measured attribute and the device within the microgrid.

17 Claims, 5 Drawing Sheets

```
% Defining new parameters based on the
measured data, such as voltage/current imbalance,
phase shifts, capacity factors, etc.

%Attribute 1

IF Load(t)> Mean Load (t)+ 3*Load StD (t)

Ec_L=211;

End

%Attribute 2

...
```

200

300

310

MICROGRID ERROR HANDLING FRAMEWORK AND METHOD

FIELD

The present disclosure relates to frameworks, methods, and systems for error handling in microgrids.

BACKGROUND OF THE INVENTION

A proliferation in renewable energy sources, batteries and power storage devices, and grid-connected electrical devices has led to a corresponding proliferation in microgrids that include groups of electrical generators, storage, and loads that are connected to a utility line. However, operating microgrids in compliance with electrical standards and/or regulations can be difficult, as microgrids vary widely in complexity and in the number and types of devices which they contain. In order to ensure proper operation of a microgrid, the microgrid must be monitored and controlled via an appropriate control scheme. The control scheme may include procedures for detecting and handling errors based on measurements received from the microgrid as a whole or from individual devices within a microgrid. Detection and handling of such errors is important, as intervention may be required to ensure safety and prevent damage to a microgrid or its components if a microgrid is experiencing abnormalities in its operation.

Conventional error handling frameworks, however, struggle to manage errors in microgrids that include many devices or many types of devices. Each type of device in a microgrid can provide a different set of measurements, making error detection differ for each device type in the microgrid. Furthermore, it is difficult to separate or distinguish between transient/non-severe errors, and errors which are permanent and/or severe. Furthermore, known error handling frameworks are limited in that errors are handled either sequentially or non-sequentially over time.

Conventional microgrids may be monitored based on measurements taken from within the microgrid to evaluate microgrid health and determine when abnormalities in the microgrid exist. Conventional solutions also include targeted error handling methodologies and/or structures that are designed to handle a single type of error, but do not offer functionality or flexibility beyond the specific error they are designed for. Furthermore, conventional error handling solutions may not be capable of handling more than one error, especially simultaneously, and/or managing faulty measurements independently.

Accordingly, there is a need for improved methods and frameworks for error handling to manage malfunctioning components in microgrids.

BRIEF SUMMARY OF THE INVENTION

A method of handling one or more errors in a microgrid comprises measuring an attribute of a device within the microgrid for a measurement cycle and comparing the measured attribute of the device with a predetermined threshold attribute value. The presence of an error associated with the device is detected based on the comparison of the measured attribute with the predetermined threshold attribute value. An error signal is created that includes a numerical sequence having at least three digits, the numerical sequence identifying the measured attribute and the device within the microgrid.

BRIEF DESCRIPTION OF THE SEVERAL VIEWS OF THE DRAWINGS

Subject matter of the present disclosure will be described in even greater detail below based on the exemplary figures. All features described and/or illustrated herein can be used alone or combined in different combinations. The features and advantages of various implementations will become apparent by reading the following detailed description with reference to the attached drawings, which illustrate the following.

DETAILED DESCRIPTION OF THE INVENTION

Figure 1:
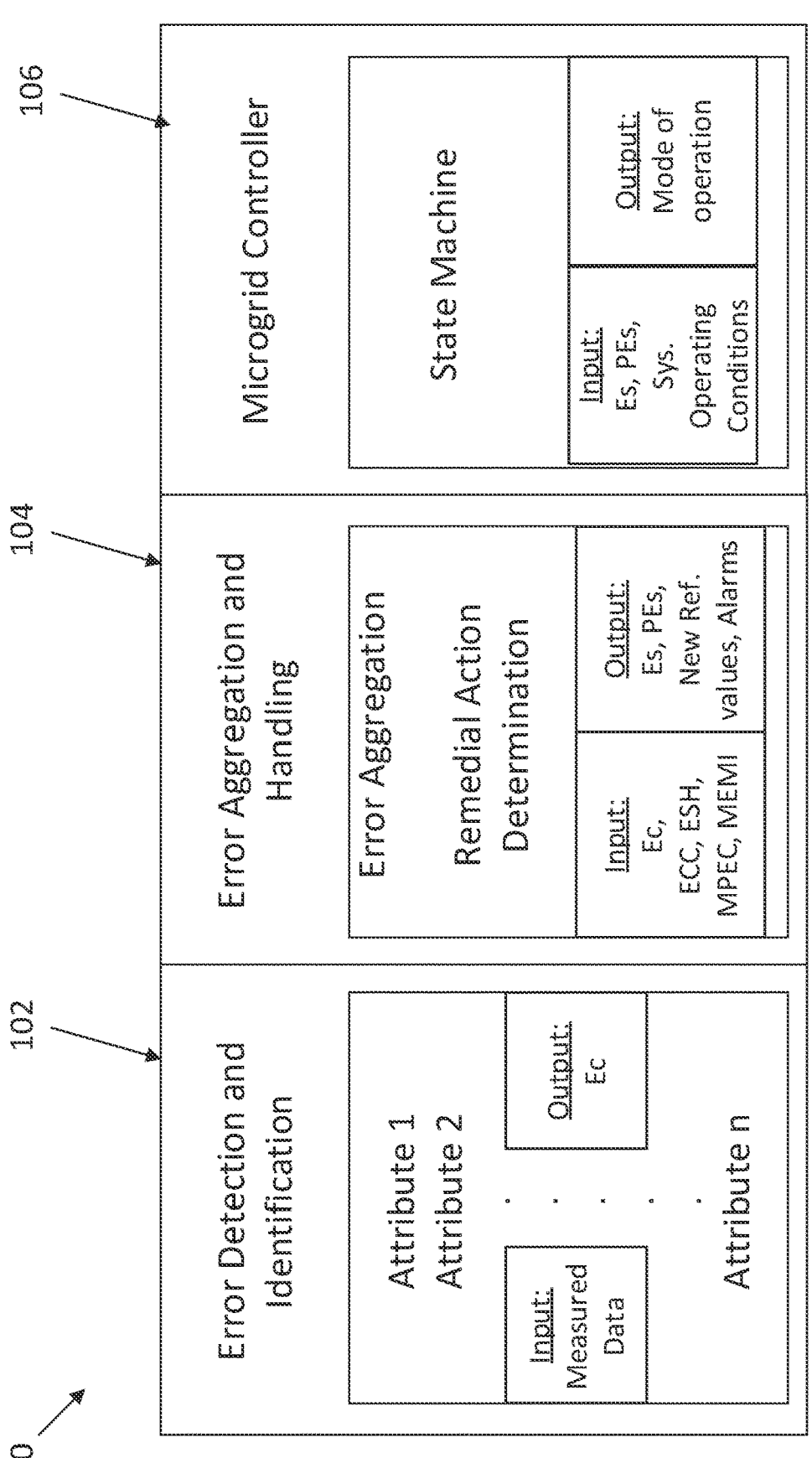
FIG. 1 illustrates an error handling framework according to an embodiment of the present disclosure.

In an aspect of the present disclosure, a modular and flexible framework is described for handling different types of errors in microgrids. Using this framework, different microgrid attributes or conditions can be defined for each component of the microgrid. As a result, if one of the attributes or conditions is violated, a specific course of action can be taken to handle such an error. Furthermore, using this architecture, transient errors can be distinguished from permanent errors. Upon generating a required error mitigation signal, aspects of the present disclosure allow system dynamics to settle and also flag a device for further inspection if a detected error for the device is determined to be permanent. Errors that occur simultaneously can also be detected. In addition, aspects of the present disclosure create an error signal that carries all information that a controller for a microgrid needs. For example, if a battery state of charge (SOC) is not within an acceptable range, an error signal may be provided that specifies that the faulty item is a battery energy storage system (BESS) and that the problem is that a battery SOC was measured erroneously.

Embodiments of the present disclosure provide a flexible framework for incorporating any thresholds that according to a user's preference in error handling. The framework is also flexible in that fixed thresholds or probabilistic thresholds can be incorporated into error handling. In an advantage over conventional error handling systems and methods, embodiments of the present disclosure also provide a means for separating temporary errors from permanent errors, taking into consideration the dynamics of a system, and providing for different remedial actions that can be taken for severe error cases and non-severe error cases. Automatic evaluation of error persistency is also incorporated into error handling, and provision is also made for flagging a device that requires further inspection as necessary. Embodiments of the present disclosure also enable identification of multiple errors at the same time, and allow an error type and faulty item to be reported to a microgrid controller for remedial action. An embodiment of the present disclosure provides an algorithm that is modular and can be implemented for any microgrid structure.

Furthermore, embodiments of the present disclosure provide for improved computational efficiency in error handling, as a single signal with consolidated error data for a plurality of simultaneously detected errors can be processed instead of several signals from several input channels being processed. Computational speeds associated with error handling are also increased, as embodiments of the present disclosure enable determination of remedial actions for more urgent and permanent errors within a single signal, as opposed to requiring a process that fully handles a non-urgent signal without an error indication before having to proceed to process a subsequent error signal.

FIG. 1 illustrates an error handling framework according to an embodiment of the present disclosure. The framework 100 includes an error detection and identification layer 102, an error aggregation and handling layer 104, and a microgrid controller layer 106. The error detection and identification layer 102 includes measurements taken from inside a microgrid, each measurement corresponding to a measured value of an attribute of a device of the microgrid. The error aggregation and handling layer 104 includes error aggregation that is carried out at a microgrid controller level and is responsible for integrating all error signals and generating remedial actions. The microgrid controller layer 106 includes one or more physical microgrid controllers with embedded selector functionalities. The microgrid controllers provide appropriate modes of operation in response to its inputs, which will be described in greater detail hereafter. The microgrid controller is configured to determine a mode of operation based on outputs received from the error aggregation and handling layer 104 as inputs to a state machine. The state machine may also receive as inputs other system operating conditions. The state machine is then used to determine a mode of operation based on the inputs, and the microgrid controller implements control of components of the microgrid according to the determined mode of operation.

The error detection and identification layer 102 includes several attributes that can be defined, each of which can be considered an independent module requiring certain measurements. Every attribute can interact with other modules or layers through a code convention described in the present disclosure, and the error aggregation and handling layer 104 can treat each module with a minimum level of dependency on other modules. As a result of the foregoing, the error detection and identification layer 102 provides for modularity that can accommodate a variety of systems that have varying attribute monitoring needs, while always enabling handling of more than one error simultaneously.

For instance, the standard measurements of conventional generators and renewable energy sources may include current, voltage, active power, and reactive power. Batteries can provide their respective active power and reactive power states, as well as their respective SOC. Standard measurements for loads could be active and reactive demand consumption, as well as a load power factor. To detect breaker errors, all operational flags from one or more line breakers, which may include one or more point of common coupling breakers, may be used. The one or more line breakers could be designed for over-current, over-voltage, and/or over-frequency protection.

The operational flags can be stored as a real-time signal or stored in an array to provide historical behavior of the signals. The measurements, whether embodied as real-time measurements or historical data, may then be compared with predefined thresholds. The predefined thresholds may be fixed for real-time data. For example, it is possible to determine the maximum output of a photovoltaic (PV) unit from its datasheet and use it as a predefined threshold. This threshold is compared with the provided measurement. If the measurement exceeds the predefined threshold, an error signal (Ec) is generated.

Figure 2:
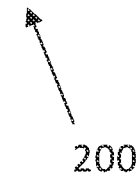
FIG. 2 illustrates computer-implemented code for performing an error determination comparison according to an embodiment of the present disclosure.

For historical data, a historical mean value of a particular measured attribute may be determined and compared against a current measured value of the attribute. Specifically, the measurement may be compared against the historical mean value plus three times a standard deviation of the historical values. As a result, an error signal accuracy of 99% or more can be achieved. The foregoing comparison is illustrated in FIG. 2 in the form of a code or script 200 that may be implemented in software. However, if the measurement is compared against the historical mean value plus two times the standard deviation, an error signal accuracy of 95% or more can be achieved. The foregoing comparisons are useful for detecting errors in loads and renewable energy sources, since such data varies through time. If enough historical information is stored in the error handling framework, mean and standard deviation values can be calculated easily for different time periods. The measured values can then be compared with dynamic thresholds to determine if they are correlated with past data, and an error signal can be generated if a corresponding error is determined to have occurred based on such a comparison.

To distinguish severe errors from non-severe errors, a code convention for reporting the errors is required. Accordingly, a three-digit numeric error code is provided wherein the first and second digits denote a faulty item and its identifying number, and wherein the third digit indicates the cause of the error. A lookup table may be provided, thereby making it possible to select each digit from the lookup table. The lookup table may be defined in a user interface for items and attributes defined in the error detection and identification layer 102. For illustrative purposes, an error code may, for example, be "521." If the value 5 is correlated to a BESS of the microgrid in the lookup table, then error code 521 would refer to a BESS identified by value 2. The third digit, 1, would then identify an attribute of the identified device of the microgrid. For example, FIG. 2 illustrates an error code Ec of "211," wherein the third digit corresponds to an attribute identified by the value 1. The foregoing error code formats and the meaning of the digits within the error code will be explained in more detail hereafter with reference to FIG. 3. The remaining steps of an error handling process can then be carried out according to the remaining layers of the error handling framework and as described hereafter.

Figure 3:
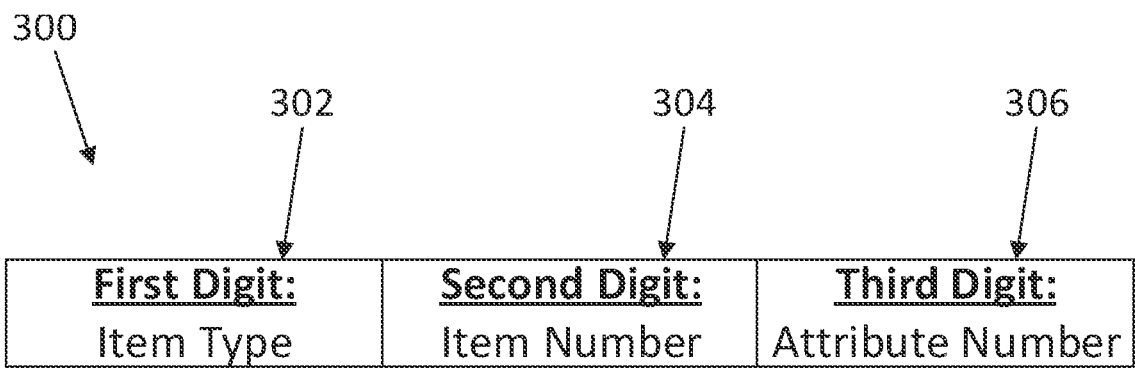
FIG. 3 illustrates a lookup table template and a lookup table according to an embodiment of the present disclosure.
Figure 3:
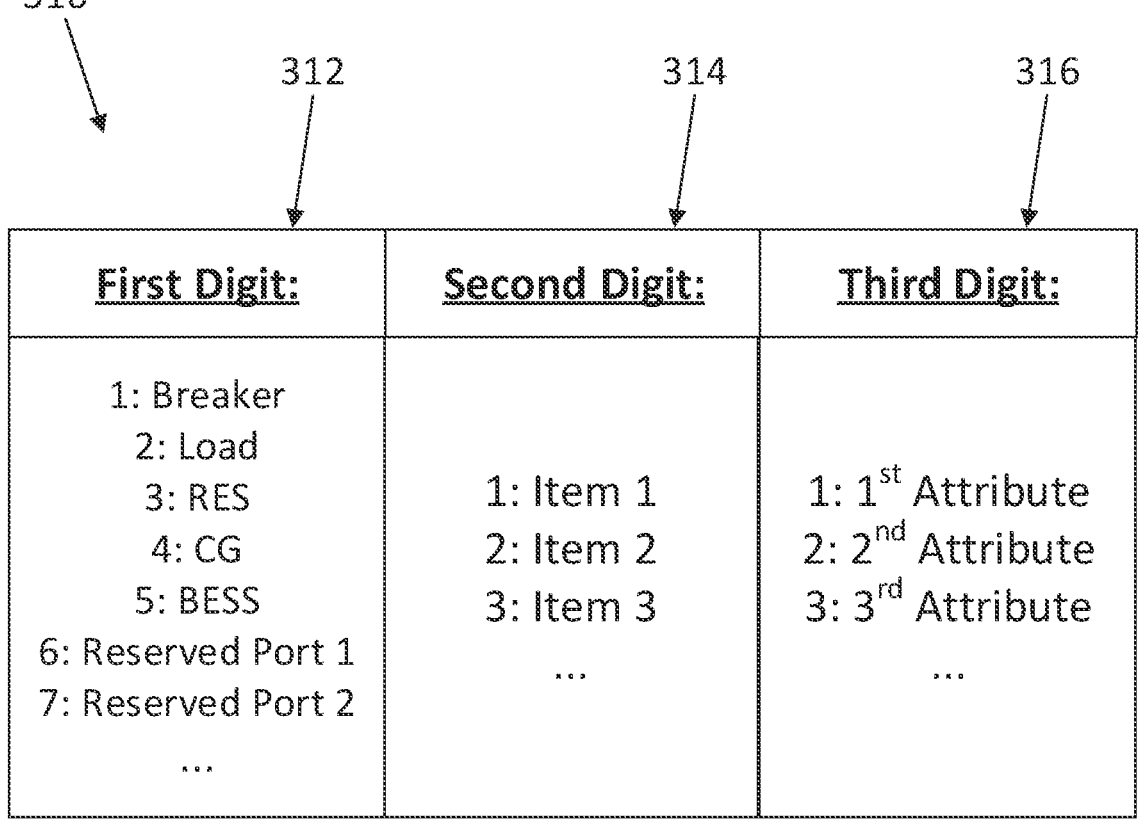

FIG. 3 illustrates a lookup table template 300 and a lookup table 310. The lookup table template 300 includes entries for each of three digits that make up an error code. Specifically, the lookup table template 300 includes an item type identification value for a first digit 302, an item number identification value for a second digit 304, and an attribute identification value for a third digit 306. The lookup table 310 represents an illustrative example of the form an implemented lookup table may have according to an embodiment of the present disclosure. For the first digit 312, various item types in a microgrid are listed with their corresponding value. In the illustrated embodiment, the microgrid items may include breakers, loads, renewable energy sources (RES), conventional generators (CG), battery energy storage systems (BESS), and reserved ports for unidentified items or items that may be selectively connected to the microgrid. The second digit 314 includes various values for identifying a particular device within a type or category of devices from the first digit 312. The third digit 316 includes various attributes, each being associated with a value that may be used as the third digit.

The error aggregation and handling layer 104 creates two types of signals: aggregated error signals (Es) and permanent error signals (PEs). Es will be generated whenever thresholds in the first layer (e.g., the error detection and identification layer 102) are violated. For example, if the lookup table indicates that an attribute value of 1 indicates that a threshold has been violated, an Es will be generated in which at least one of the Ec signals is 1. PEs, on the other hand, need to be evaluated in greater detail. Three parameters are introduced for this purpose. The first parameter is referred to as an error cycle count (ECC). Using this parameter, the persistence of an error can be monitored, and whether the error is transient or permanent can be determined. For example, when the ECC is set to 3, the error handling module ignores any errors that last less than three cycles. PEs will become one (indicating the presence of a permanent error) if Es exceeds the specified conditions at the first layer for more than three cycles.

A timeframe may be required for a remedial action to be applied depending on the type of faulty measurement. For example, it may be necessary to temporarily set an active power P and a reactive power Q of the battery to zero if the battery active power is greater than its maximum value for longer than defined by the ECC. This is achieved by setting the reference values of P and Q to zero. However, it may take some time for the battery to settle down to its new reference value after going through some transients. The PEs must be maintained for a specified period of time in order to achieve this goal. This time period is referred to as an error signal hold (ESH) and should be different for every component depending on the component's dynamic behavior. The ESH for a particular component is directly dependent on the settling time of the component. The ESH for a component can be determined by applying a step change to the component's input and then calculating the time elapsed from application of the step change to output by the component within a stable band. For effective error handling, the value of ESH for a component should be higher than the settling time of the component. Upon completion of ESH, PEs are reset to zero and the error detection process is repeated.

If multiple erroneous measurements are observed within a short period of time, this could signal a serious problem that requires human intervention. Therefore, another parameter, referred to as maximum permanent error count (MPEC), is defined. For the MPEC to be incorporated into the error handling framework, a time range within which it will be performed must be determined. This time range is referred to as the maximum erroneous measurement interval (MEMI), and is completely adjustable by a microgrid operator. The error handling framework then counts the number of PEs, compares them with the MPEC during the MEMI, and flags the device for further inspection if the number of PEs exceeds the MPEC. At this stage, service staff must check the item and perform the necessary maintenance before it can be brought back online.

Figure 4:
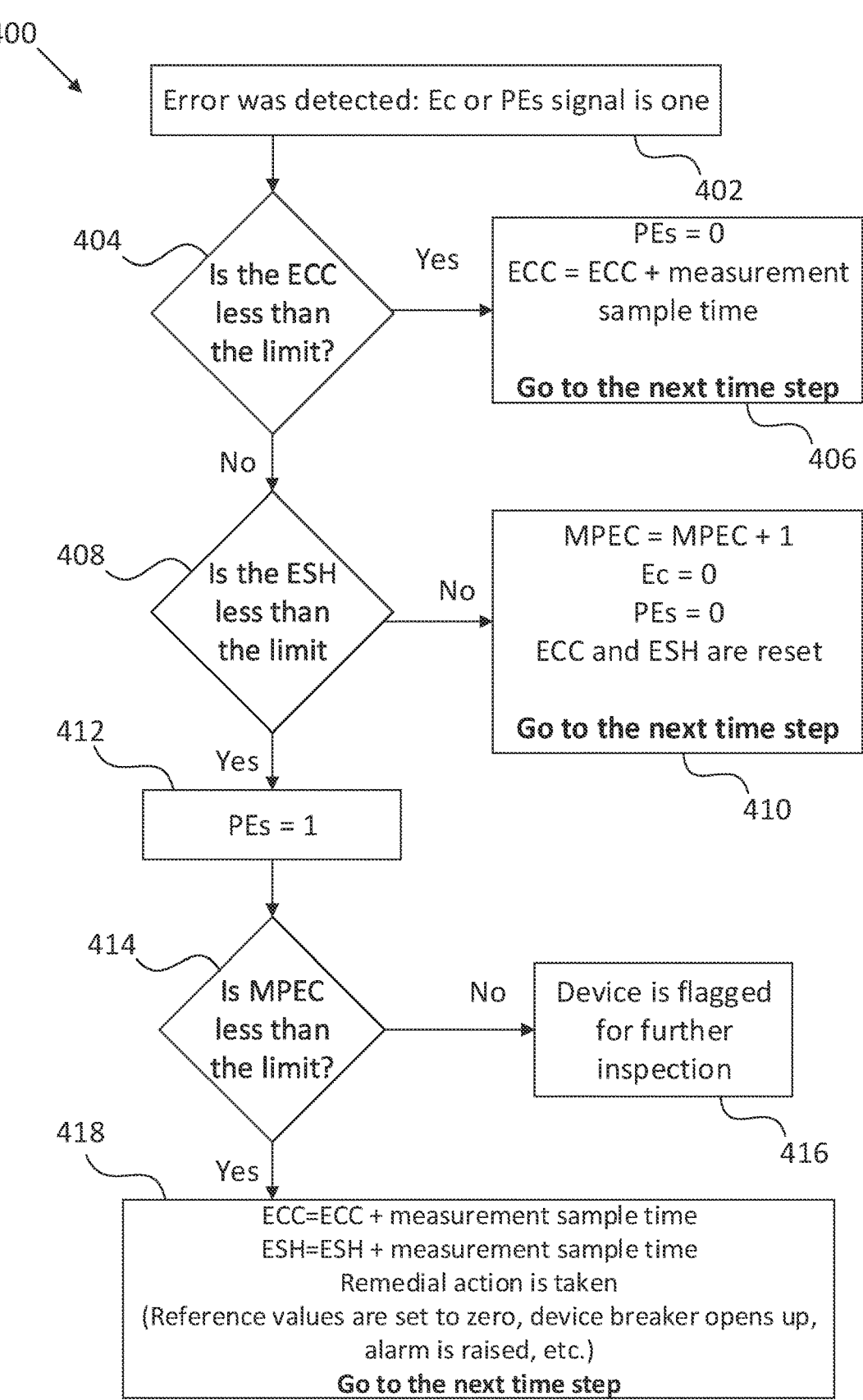
FIG. 4 illustrates a flowchart for an error handling method according to an embodiment of the present disclosure.

FIG. 4 illustrates a flowchart 400 for the error handling module and provides a visual illustration of the error handling process described above. First, an error is detected 402 based on whether the Ec or PEs signal is set to a corresponding value indicating that an error was detected. In the illustrated embodiment, Ec is set to one (Ec=1) or PEs is set to one (PEs=1). This triggers query 404 to determine whether ECC is less than a predetermined limit. If the ECC is less than the predetermined limit, step 406 is carried out in which the permanent error signal is set to zero, the ECC is increased by the measurement sample time, and the process proceeds to the next time step, thereby repeating from the beginning the process illustrated by flowchart 400. If the ECC is not less than the predetermined limit, a query 408 is made to determine whether ESH is less than a predetermined limit. If not, step 410 is carried out in which MPEC is increased in value, Ec is set to zero, PEs is set to zero, both the ECC and ESH are reset, and the process proceeds to the next time step, thereby repeating from the beginning the process illustrated by flowchart 400. If the ESH is less than the predetermined limit, then the permanent error signal is set to one to indicate the presence of a permanent error in step 412.

Next, a query 414 is made to determine whether MPEC is less than a predetermined limit. If not, the device identified by the Ec signal is flagged for further inspection in step 416. If MPEC is less than the predetermined limit, step 418 is carried out. In step 418, the ECC and ESH are each increased by a measurement sample time. Remedial action is taken to more urgently address the errors detected. Remedial actions taken may include setting reference values to zero, tripping a breaking or other trip mechanism, and/or raising an audial and/or visual alarm. Then, the process proceeds to the next time step and is repeated if the Ec signal still indicates an error is detected.

In the event of a severe error, a device must be disabled. However, if the error is not severe, an alarm or indicator can be set off to alert the microgrid operators. Depending on the nature of the error, an appropriate action can then be taken. A microgrid controller should be capable of operating in two modes. In a first mode, severe error cases can be auto-corrected by disabling devices associated with the errors. The dispatchability of the device is directly related to this action. The reference values can be set to zero if the item can be dispatched. In the event that the device is not dispatchable, this can be performed by opening the device breakers. A second mode of operation for non-severe cases is handled by a strategy in which only notifications are employed.

In an embodiment, the error handling framework of the present disclosure has the ability to handle multiple errors simultaneously. This is because the Es signal may be embodied as an array that includes all real-time error information. For example, the Es signal may have the form [0, 0, 314, 0, 521, . . . ], which would indicate errors in for the devices identified by error codes 314 and 521, and specifically that erroneous measurements were measured for the $4^{th}$ attribute for the item identified by digits 31, and for the $1^{st}$ attribute for the item identified by digits 52. It is possible for a microgrid controller to process both of these error instances in parallel and suggest actions that can mitigate the impact of both of these errors.

It will be readily understood that embodiments described in the present disclosure are exemplary, and that modifications may be made without departing from the spirit of the disclosure. For example, while a specific convention for Ec and PEs values has been described in the foregoing exemplary embodiment according to flowchart 400, the particular value (0 or 1) of the signal is not crucial. A person of ordinary skill in the art would readily recognize that whether a signal of zero is used to indicate the existence of an error or the non-existence of an error (or the value of a state) is merely a matter of preference and would not depart from the spirit of the process illustrated in flowchart 400 or other embodiments described herein.

Figure 5:
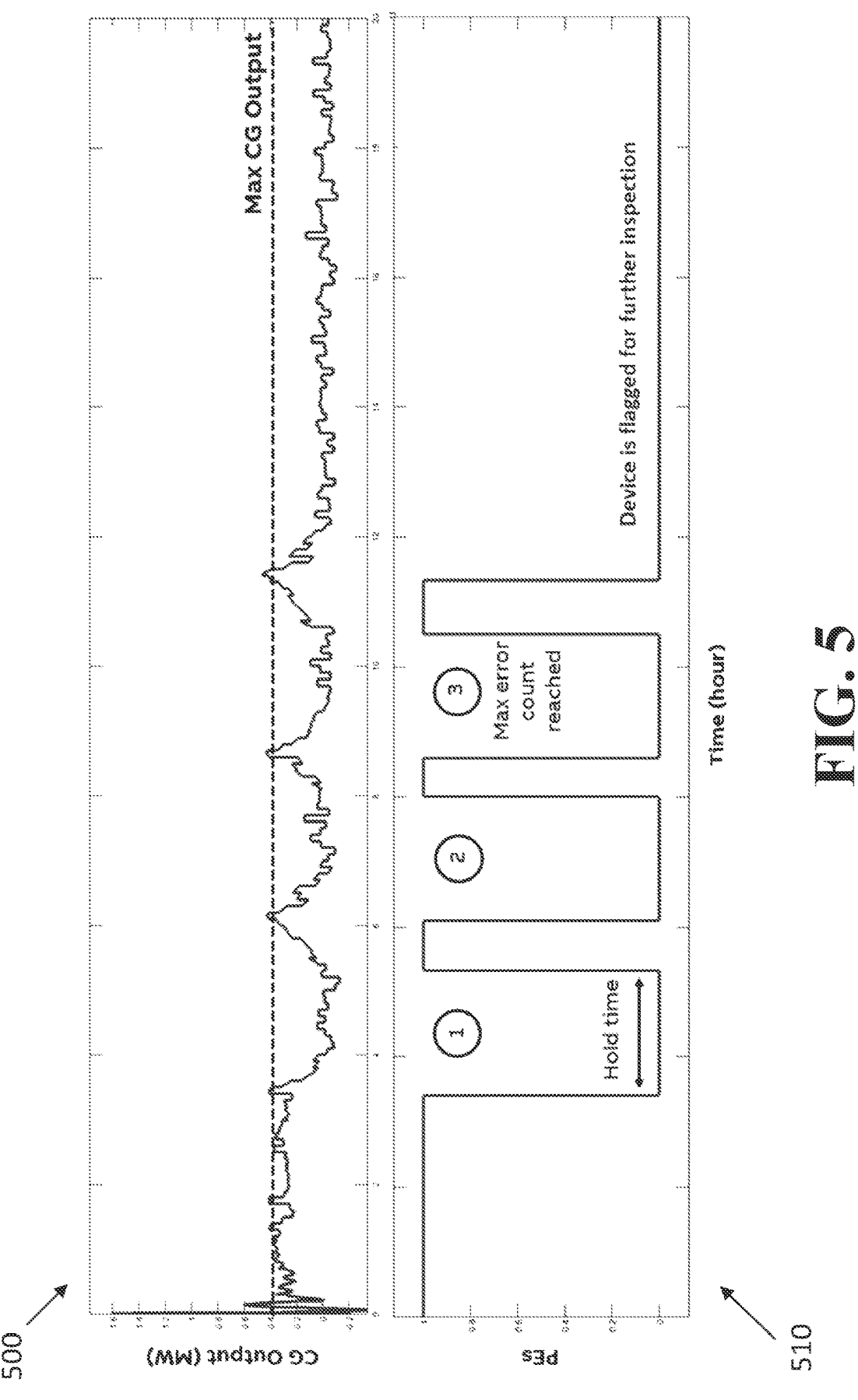
FIG. 5 illustrates results for a simulation run utilizing the error handling framework according to an embodiment of the present disclosure.

FIG. 5 illustrates results for a simulation run utilizing the error handling framework according to an embodiment of the present invention. Specifically, FIG. 5 illustrates a simulated conventional generator (CG) output plot 500 in which the output of the CG in megawatts is plotted over time. A corresponding simulated permanent error plot 510 is also illustrated in which the signal value of PEs is plotted over the same period of time as the CG output plot 500. In the illustrated simulation, the CG output exceeds a threshold defined in the error handling framework. As a result, the CG device is flagged for further inspection after an MPEC limit of 3 is reached. In the illustrated embodiment, a high signal for PEs (PEs=1) is used to indicate a nominal value while a low signal (PEs=0) is used to indicate a permanent error. As previously described, this difference of convention does not render the embodiment of FIG. 5 incompatible with other embodiments described in the present disclosure, but merely represents a difference in signal convention that may be implemented in any embodiment described herein.

As illustrated in error plot 510 of FIG. 5, the PEs is set to zero (which, in the illustrated embodiment, is indicative of a permanent error) at a time when the CG output exceeds a threshold max CG output. During time period number 1 of error plot 510, the PEs signal is maintained at zero during a hold time. During this hold time, the CG output drops to zero because the CG is disabled. The existence of a faulty measurement is evident in that the correct output value of the CG should be zero for the entire period in which CG is disabled, but a varying nonzero output is being measured in output plot 500 during time period number 1. After the hold time has expired, the PEs is reset to one (PEs=1) and the CG is enabled. The foregoing process of time period number 1 is repeated for time period number 2 and 3 when the CG output again exceeds the threshold max CG output value. However, upon an MPEC limit being reached, the PEs is set to zero (PEs=0) beyond the hold time and the device is flagged for further inspection.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of handling one or more errors in a microgrid, comprising:

measuring an attribute of a device within the microgrid for a measurement cycle;

comparing the measured attribute of the device with a predetermined threshold attribute value;

detecting, based on the comparison of the measured attribute with the predetermined threshold attribute value, the presence of an error associated with the device;

creating an error signal that includes a numerical sequence having at least three digits, the numerical sequence identifying the measured attribute and the device within the microgrid;

determining an error cycle count, wherein the error cycle count increases for each measurement cycle in which the error is detected;

comparing the error cycle count to a predetermined error cycle count value;

determining, based on the comparison of the error cycle count to the predetermined error cycle count value, whether the error is a persistent error;

determining an error signal hold time;

comparing the error signal hold time to a predetermined error signal hold time threshold;

determining, based on the comparison of the error signal hold time to the predetermined error signal hold time threshold, whether the error is a permanent error or a transient error; and increasing a maximum permanent error count if the error signal hold time exceeds the predetermined error signal hold time threshold.

2. The method of claim 1, comprising:

comparing the maximum permanent error count to a maximum permanent error count threshold; and determining whether to flag the device for further inspection or to initiate a remedial action based on the comparison of the maximum permanent error count to the maximum permanent error count threshold.

3. The method of claim 2, wherein the remedial action includes one or more of tripping a breaker, setting reference values to zero, initiating an audial alarm, and initiating a visual alarm.

4. The method of claim 1, wherein the numerical sequence includes at least three digits, wherein one of the at least three digits identifies the type of the device, wherein one of the at least three digits identifies an identification number of the device, and wherein one of the at least three digits identifies the attribute.

5. The method of claim 4, further comprising providing a lookup table and identifying the device and the attribute based on their correlation with values of the at least three digits in the lookup table.

6. The method of claim 1, wherein the error signal includes an array with a plurality of numerical sequences.

7. The method of claim 1, comprising:

forwarding the error signal to a state machine of a microgrid controller;

determining an operating mode of the microgrid based an output of the state machine; and operating the microgrid according to the operating mode with the microgrid controller.

8. The method of claim 1, wherein the predetermined threshold attribute value is a mean historical value of the attribute plus three times a standard deviation of the historical value of the attribute.

9. The method of claim 8, wherein the predetermined threshold attribute value is dynamically calculated based on the historical value of the attribute over time and over a plurality of measurement cycles.

10. The method of claim 1, wherein the steps of the method are iteratively repeated to provide real-time error signals to a microgrid controller.

11. A non-transitory computer-readable medium having processor-executable instructions stored thereon, wherein the processor-executable instructions, when executed by one or more processors, facilitate performance of a method of handling one or more errors in a microgrid comprising:

measuring an attribute of a device within the microgrid for a measurement cycle;

comparing the measured attribute of the device with a predetermined threshold attribute value;

detecting, based on the comparison of the measured attribute with the predetermined threshold attribute value, the presence of an error associated with the device;

creating an error signal that includes a numerical sequence having at least three digits, the numerical sequence identifying the measured attribute and the device within the microgrid;

determining an error cycle count, wherein the error cycle count increases for each measurement cycle in which the error is detected;

comparing the error cycle count to a predetermined error cycle count value;

determining, based on the comparison of the error cycle count to the predetermined error cycle count value, whether the error is a persistent error;

determining an error signal hold time:

comparing the error signal hold time to a predetermined error signal hold time threshold;

determining, based on the comparison of the error signal hold time to the predetermined error signal hold time threshold, whether the error is a permanent error or a transient error; and increasing a maximum permanent error count if the error signal hold time exceeds the predetermined error signal hold time threshold.

12. A system comprising one or more processors which, alone or in combination, are configured to provide for execution of a method comprising:

measuring an attribute of a device within a microgrid for a measurement cycle;

comparing the measured attribute of the device with a predetermined threshold attribute value;

detecting, based on the comparison of the measured attribute with the predetermined threshold attribute value, the presence of an error associated with the device;

creating an error signal that includes a numerical sequence having at least three digits, the numerical sequence identifying the measured attribute and the device within the microgrid;

determining an error cycle count, wherein the error cycle count increases for each measurement cycle in which the error is detected;

comparing the error cycle count to a predetermined error cycle count value;

determining, based on the comparison of the error cycle count to the predetermined error cycle count value, whether the error is a persistent error;

determining an error signal hold time;

comparing the error signal hold time to a predetermined error signal hold time threshold;

determining, based on the comparison of the error signal hold time to the predetermined error signal hold time threshold, whether the error is a permanent error or a transient error; and increasing a maximum permanent error count if the error signal hold time exceeds the predetermined error signal hold time threshold.

13. The system of claim 12, wherein the method further comprises:

comparing the maximum permanent error count to a maximum permanent error count threshold; and determining whether to flag the device for further inspection or to initiate a remedial action based on the comparison of the maximum permanent error count to the maximum permanent error count threshold.

14. The system of claim 13, wherein the remedial action includes one or more of tripping a breaker, setting reference values to zero, initiating an audial alarm, and initiating a visual alarm.

15. The system of claim 12, wherein the numerical sequence includes at least three digits, wherein one of the at least three digits identifies the type of the device, wherein one of the at least three digits identifies an identification number of the device, and wherein one of the at least three digits identifies the attribute.

16. The system of claim 15, wherein the method further comprises providing a lookup table and identifying the device and the attribute based on their correlation with values of the at least three digits in the lookup table.

17. The system of claim 12, wherein the error signal includes an array with a plurality of numerical sequences.

* * * * *